US012597414B2

(12) United States Patent
Tran et al.

(10) Patent No.: US 12,597,414 B2
(45) Date of Patent: Apr. 7, 2026

(54) GENERATION OF TRAINING EXAMPLES FOR TRAINING AUTOMATIC SPEECH RECOGNIZERS

(71) Applicant: International Business Machines Corporation, Armonk, NY (US)

(72) Inventors: Ngoc Minh Tran, Dublin (IE); Hessel Tuinhof, Dublin (IE); Beat Buesser, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 373 days.

(21) Appl. No.: 18/054,670

(22) Filed: Nov. 11, 2022

(65) Prior Publication Data

US 2024/0161733 A1 May 16, 2024

(51) Int. Cl.
| | |
|---|---|
| *G10L 15/06* | (2013.01) |
| *G10L 15/01* | (2013.01) |
| *G10L 15/065* | (2013.01) |
| *G10L 25/18* | (2013.01) |

(52) U.S. Cl.
CPC ............ *G10L 15/063* (2013.01); *G10L 15/01* (2013.01); *G10L 15/065* (2013.01); *G10L 25/18* (2013.01)

(58) Field of Classification Search
CPC ..... G10L 15/063; G10L 15/01; G10L 15/065; G10L 25/18
See application file for complete search history.

(56) References Cited

U.S. PATENT DOCUMENTS

| | | | |
|---|---|---|---|
| 2019/0220755 A1 | 7/2019 | Carbune | |
| 2019/0287515 A1* | 9/2019 | Li | G06N 3/084 |
| 2020/0134468 A1 | 4/2020 | Ding | |
| 2020/0395035 A1 | 12/2020 | Kolter | |
| 2020/0410228 A1 | 12/2020 | Wang | |
| 2021/0166705 A1* | 6/2021 | Chang | G10L 25/30 |
| 2021/0256978 A1* | 8/2021 | Jin | G06N 3/0464 |

(Continued)

FOREIGN PATENT DOCUMENTS

| | | |
|---|---|---|
| CN | 110767216 A | 2/2020 |
| EP | 37128221 A | 9/2020 |

OTHER PUBLICATIONS

Carlini et al., "Audio Adversarial Examples: Targeted Attacks on Speech-to-Text," Mar. 30, 2018, 7 pages. <https://arxiv.org/pdf/1801.01944.pdf >.

(Continued)

*Primary Examiner* — Richemond Dorvil
*Assistant Examiner* — Ethan Daniel Kim
(74) *Attorney, Agent, or Firm* — Stephen R. Yoder

(57) ABSTRACT
A method, computer program product, and computer system for generation of training examples for training an automatic speech recognizer. Embodiments of the present invention can receive a training dataset of original audio signals and generate training examples for training an automatic speech recognizer based, at least in part, on a constructed imperceptible space for an original audio signal of the original audio signals and adversarial audio examples in the constructed imperceptible space. Embodiments of the present invention can then generate an imperceptible and adversarial audio example to an adversarial trainer for the automatic speech recognizer.

19 Claims, 6 Drawing Sheets

100

(56) References Cited

U.S. PATENT DOCUMENTS

| | | | | |
|---|---|---|---|---|
| 2021/0319784 A1* | 10/2021 | Le Roux | .............. | G06N 3/0442 |
| 2021/0350786 A1* | 11/2021 | Chen | .................... | G10L 15/063 |

OTHER PUBLICATIONS

Lin et al., "Principles of Psychoacoustics," Chapter 2 of Audio Watermark: A Comprehensive Foundation Using MATLAB, 2015, pp. 15-49, Springer International Publishing. https://link.springer.com/chapter/10.1007/978-3-319-07974-5_2.
Madry et al., "Towards Deep Learning Models Resistant to Adversarial Attacks," Sep. 4, 2019, 28 pages. <https://arxiv.org/pdf/1706.06083.pdf>.
Mendes et al., "Defending Against Imperceptible Audio Adversarial Examples Using Proportional Additive Gaussian Noise," MIT PRIMES, Jul. 2020, pp. 1-9. <https://18.4.43.22/research/highschool/primes/materials/2020/Mendes-Hogan.pdf>.
Nicolae et al., "Adversarial Robustness Toolbox v1.0.0," Nov. 15, 2019, 34 pages. <https://arxiv.org/pdf/1807.01069.pdf>.
Qin et al., "Imperceptible, Robust, and Targeted Adversarial Examples for Automatic Speech Recognition," Proceedings of the 36th International Conference on Machine Learning, 2019, 13 pages. <https://arxiv.org/pdf/1903.10346.pdf>.
Schonherr et al., "Adversarial Attacks Against Automatic Speech Recognition Systems via Psychoacoustic Hiding," Oct. 30, 2018, 18 pages. <https://arxiv.org/pdf/1808.05665.pdf>.
Wong et al., "Fast is better than free: Revisiting adversarial training," Published as a conference paper at ICLR 2020, Jan. 12, 2020, 17 pages. <https://arxiv.org/pdf/2001.03994.pdf>.

* cited by examiner

100

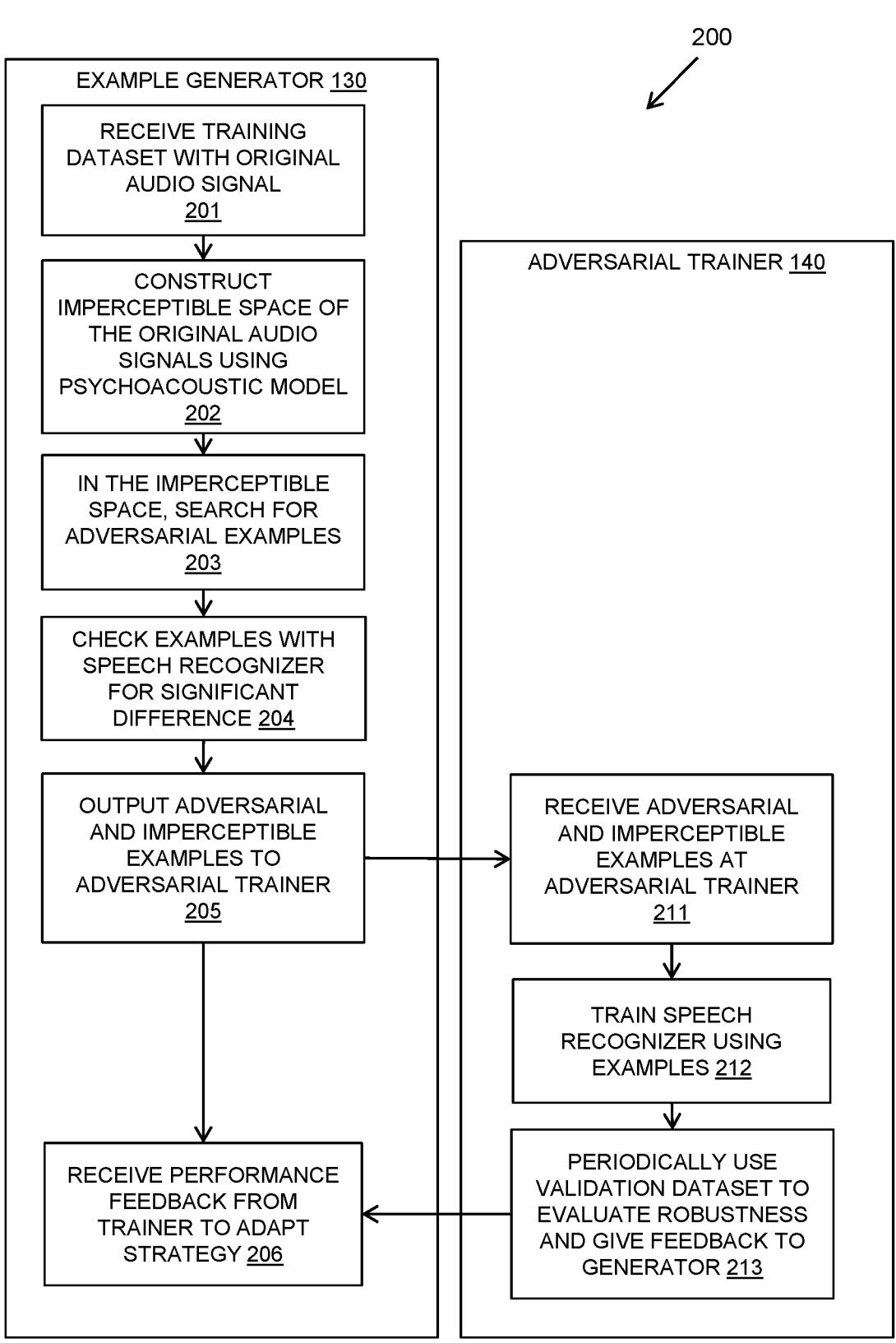

200

EXAMPLE GENERATOR 130

RECEIVE TRAINING DATASET WITH ORIGINAL AUDIO SIGNAL
201

CONSTRUCT IMPERCEPTIBLE SPACE OF THE ORIGINAL AUDIO SIGNALS USING PSYCHOACOUSTIC MODEL
202

IN THE IMPERCEPTIBLE SPACE, SEARCH FOR ADVERSARIAL EXAMPLES
203

CHECK EXAMPLES WITH SPEECH RECOGNIZER FOR SIGNIFICANT DIFFERENCE 204

OUTPUT ADVERSARIAL AND IMPERCEPTIBLE EXAMPLES TO ADVERSARIAL TRAINER
205

RECEIVE PERFORMANCE FEEDBACK FROM TRAINER TO ADAPT STRATEGY 206

ADVERSARIAL TRAINER 140

RECEIVE ADVERSARIAL AND IMPERCEPTIBLE EXAMPLES AT ADVERSARIAL TRAINER
211

TRAIN SPEECH RECOGNIZER USING EXAMPLES 212

PERIODICALLY USE VALIDATION DATASET TO EVALUATE ROBUSTNESS AND GIVE FEEDBACK TO GENERATOR 213

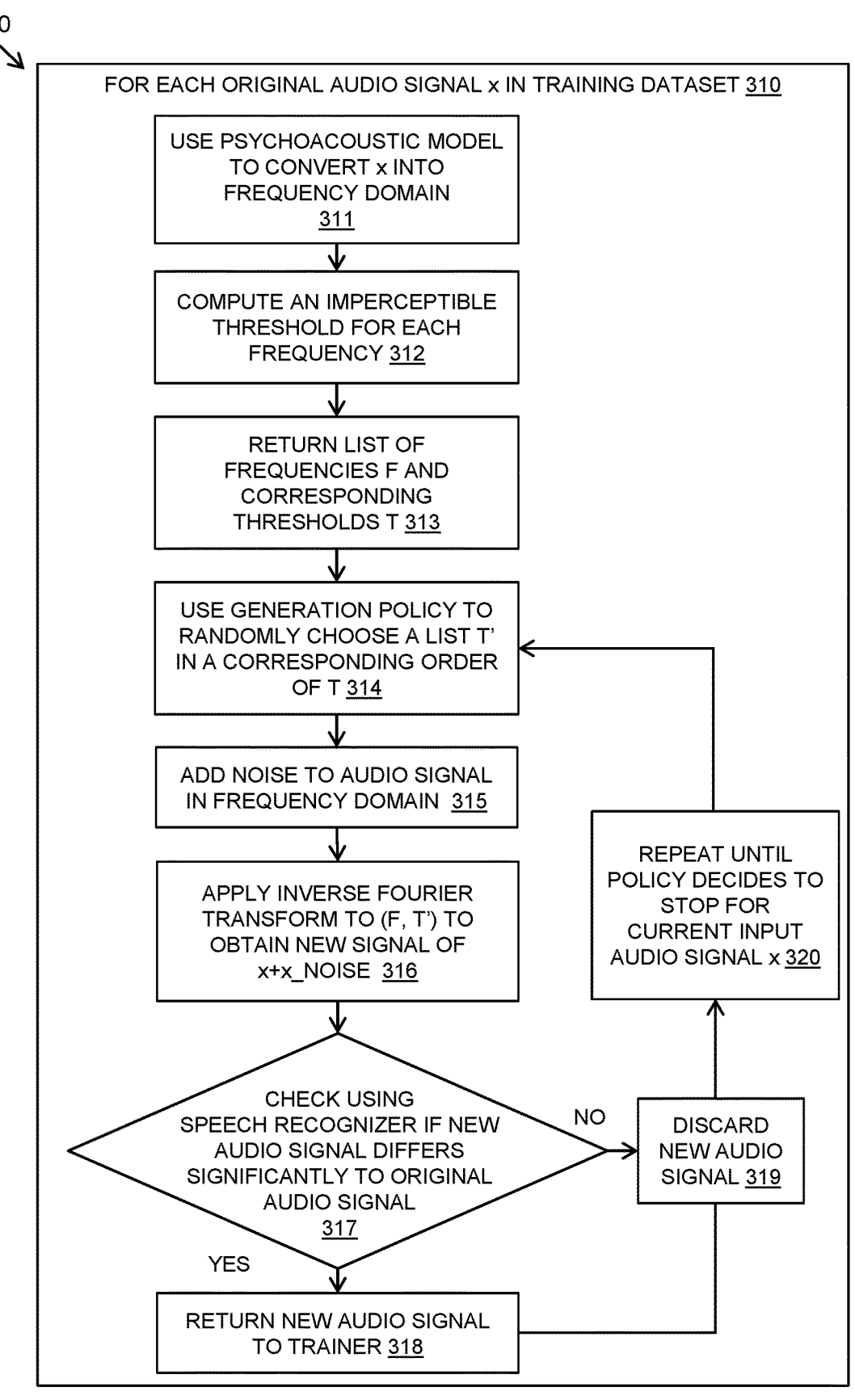

FOR EACH ORIGINAL AUDIO SIGNAL x IN TRAINING DATASET 310

USE PSYCHOACOUSTIC MODEL TO CONVERT x INTO FREQUENCY DOMAIN 311

COMPUTE AN IMPERCEPTIBLE THRESHOLD FOR EACH FREQUENCY 312

RETURN LIST OF FREQUENCIES F AND CORRESPONDING THRESHOLDS T 313

USE GENERATION POLICY TO RANDOMLY CHOOSE A LIST T' IN A CORRESPONDING ORDER OF T 314

ADD NOISE TO AUDIO SIGNAL IN FREQUENCY DOMAIN 315

APPLY INVERSE FOURIER TRANSFORM TO (F, T') TO OBTAIN NEW SIGNAL OF x+x_NOISE 316

REPEAT UNTIL POLICY DECIDES TO STOP FOR CURRENT INPUT AUDIO SIGNAL x 320

CHECK USING SPEECH RECOGNIZER IF NEW AUDIO SIGNAL DIFFERS SIGNIFICANTLY TO ORIGINAL AUDIO SIGNAL 317

NO

DISCARD NEW AUDIO SIGNAL 319

YES

RETURN NEW AUDIO SIGNAL TO TRAINER 318

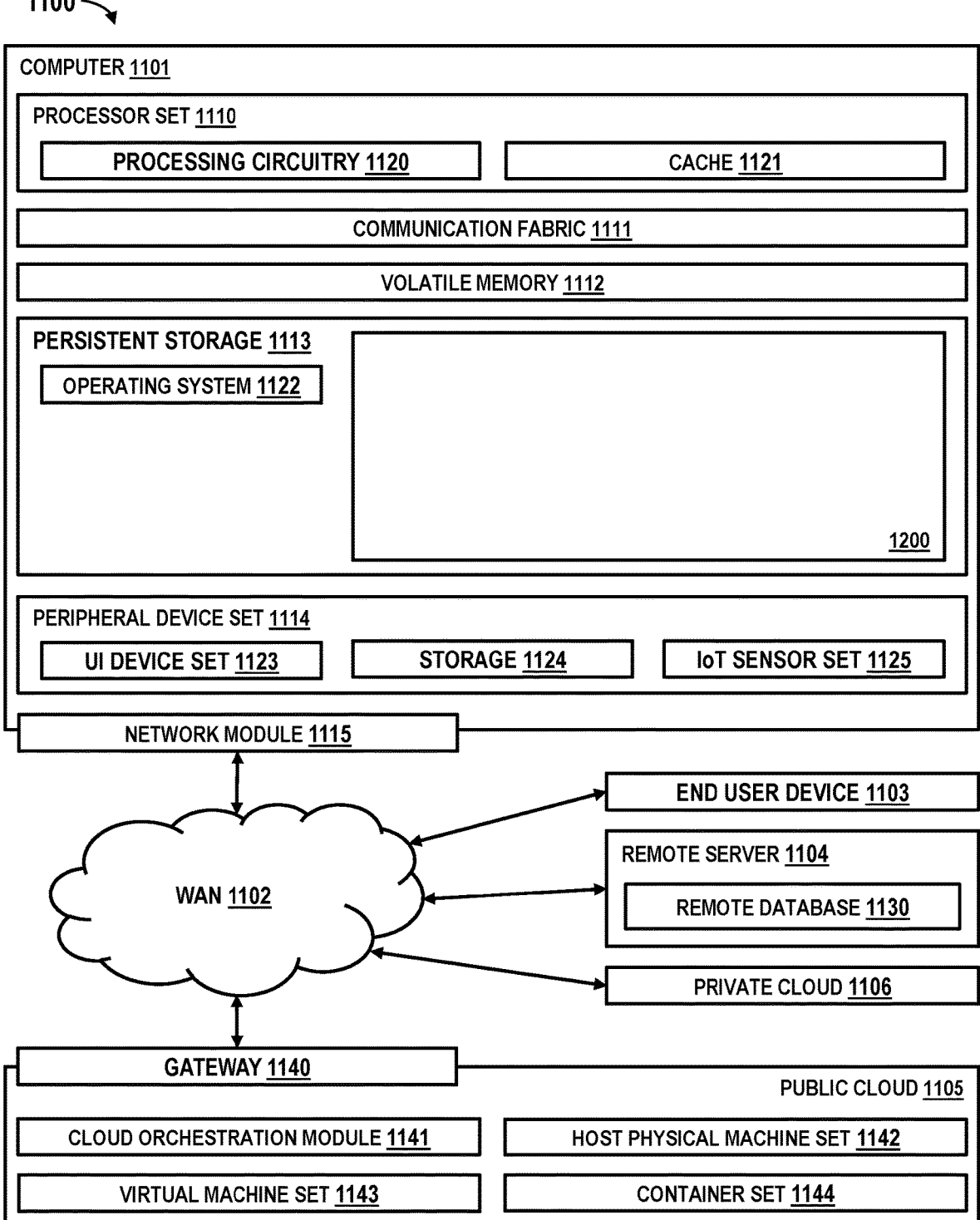

COMPUTER 1101

PROCESSOR SET 1110

PROCESSING CIRCUITRY 1120        CACHE 1121

COMMUNICATION FABRIC 1111

VOLATILE MEMORY 1112

PERSISTENT STORAGE 1113

OPERATING SYSTEM 1122

1200

PERIPHERAL DEVICE SET 1114

UI DEVICE SET 1123     STORAGE 1124     IoT SENSOR SET 1125

NETWORK MODULE 1115

WAN 1102

END USER DEVICE 1103

REMOTE SERVER 1104

REMOTE DATABASE 1130

PRIVATE CLOUD 1106

GATEWAY 1140

PUBLIC CLOUD 1105

CLOUD ORCHESTRATION MODULE 1141     HOST PHYSICAL MACHINE SET 1142

VIRTUAL MACHINE SET 1143     CONTAINER SET 1144

*FIG. 6*

GENERATION OF TRAINING EXAMPLES FOR TRAINING AUTOMATIC SPEECH RECOGNIZERS

STATEMENT REGARDING FEDERALLY SPONSORED RESEARCH OR DEVELOPMENT

The invention was made with Government support under Government Contract Number BGR #A1974710, Contract #HR001120C0013 awarded by Defense Advanced Research Projects Agency. The Government has certain rights in this invention.

BACKGROUND

The present invention relates to automatic speech recognition (ASR), and more specifically, to example generation for training automatic speech recognizers against adversarial attacks.

Adversarial attacks are becoming common and pose a critical threat to machine learning models. The availability of imperceptible automatic speech recognition (ASR) attacks makes speech recognizers susceptible to adversarial attacks.

Adversarial training is an efficient way to harden machine learning models against such adversarial attacks, and therefore a speech recognizer can also be trained adversarially to increase its adversarial robustness.

The main challenges of adversarial training a speech recognizer include the following: generating training examples that are both adversarial and imperceptible can take hours and require large amounts of computing resources. Generated training examples need to be imperceptible because, in practice, attacks to the model will generate imperceptible examples to deceive humans. This makes adversarial training impractical since very large numbers of training examples are required.

An adversarial training process depends on a pre-selected attack which is used to generate adversarial training examples. In practice, a strong attack such as a projected gradient descent (PGD) is often selected under the naïve assumption that real-world attacks are weaker than the pre-selected attack and therefore cannot deceive the trained model. However, this assumption is difficult to maintain in the domain of ASR because of the limited number of attacks available for this kind of machine learning model.

SUMMARY

According to an aspect of the present invention there is provided a computer-implemented method for generation of training examples for training an automatic speech recognizer, said method comprising: receiving a training dataset of original audio signals; and generating training examples for training an automatic speech recognizer based, at least in part, on a constructed imperceptible space for an original audio signal of the original audio signals and adversarial audio examples in the constructed imperceptible space; and generating an imperceptible and adversarial audio example to an adversarial trainer for the automatic speech recognizer.

According to another aspect of the present invention there is provided a system for generation of training examples for training an automatic speech recognizer, comprising: a processor and a memory configured to provide computer program instructions to the processor to execute the function of the components of an example generator including: a training dataset receiving component for receiving a training dataset of original audio signals; an imperceptible space component for constructing an imperceptible space for an original audio signal using a psychoacoustic model; an adversarial example checking component for searching for adversarial audio examples in the imperceptible space by checking candidate adversarial audio examples with the automatic speech recognizer to determine that there is a sufficient difference from the original audio signals to be an adversarial audio example; and an example generator component for generating an imperceptible and adversarial audio example to an adversarial trainer for the automatic speech recognizer.

According to a further aspect of the present invention there is provided a computer program product for generation of training examples for training an automatic speech recognizer, the computer program product comprising one or more computer readable storage media and program instructions stored on the one or more computer readable storage media, the program instructions comprising: program instructions to receive a training dataset of original audio signals; and program instructions to generate training examples for training an automatic speech recognizer based, at least in part, on a constructed imperceptible space for an original audio signal of the original audio signals and adversarial audio examples in the constructed imperceptible space, wherein the program instructions to generate training examples for training an automatic speech recognize comprise: program instructions to construct an imperceptible space for an original audio signal using a psychoacoustic model, and program instructions to search for adversarial audio examples in the imperceptible space by checking candidate adversarial audio examples with the automatic speech recognizer to determine that there is a sufficient difference from the original audio signals to be an adversarial audio example; and program instructions to generate an imperceptible and adversarial audio example to an adversarial trainer for the automatic speech recognizer.

The computer readable storage medium may be a non-transitory computer readable storage medium and the computer readable program code may be executable by a processing circuit.

BRIEF DESCRIPTION OF THE DRAWINGS

The subject matter regarded as the invention is particularly pointed out and distinctly claimed in the concluding portion of the specification. Embodiments of the present invention, both as to organization and method of operation, together with objects, features, and advantages thereof, may best be understood by reference to the following detailed description when read with the accompanying drawings.

Embodiments of the present invention will now be described, by way of example only, with reference to the accompanying drawings.

FIG. 2 is a swim-lane flow diagram of an example embodiment of a method in accordance with embodiments of the present invention;

FIG. 3 is a flow diagram of an example embodiment an aspect of a method in accordance with embodiments of the present invention;

FIG. 6 is a block diagram depicting components of a system in accordance with a preferred embodiment of the present invention.

Figure 1:
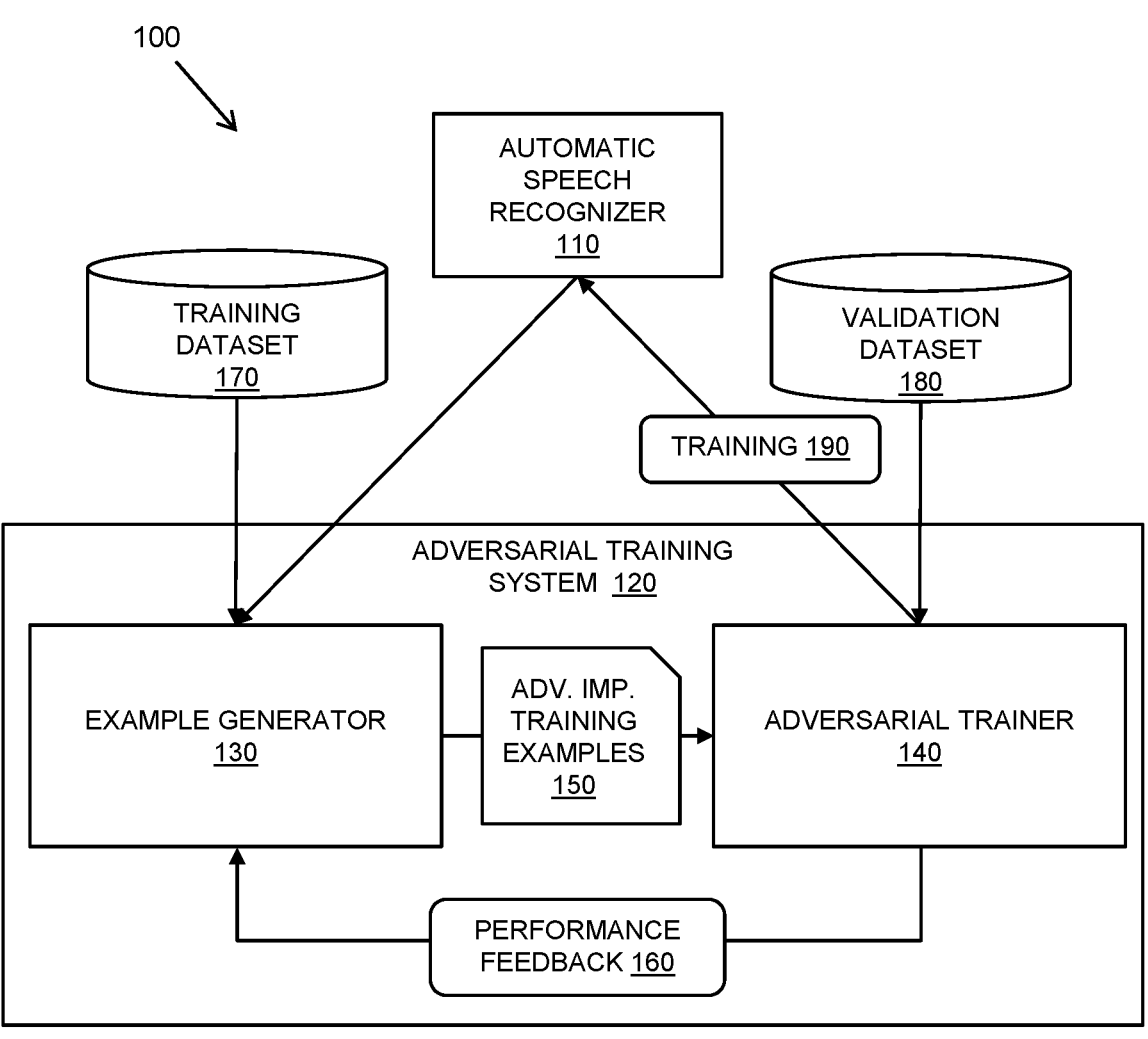
FIG. 1 is a schematic block diagram of an example embodiment of a system and method in accordance with embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

Embodiments of a method, system, and computer program product are provided for generation of training examples for training an automatic speech recognizer. Training examples are generated using the described method and system as imperceptible audio examples for adversarial training.

The generation of training examples for training an automatic speech recognizer (ASR) is an improvement in the technical field of security of automatic speech recognizers and more particularly in the technical field of security against adversarial attacks. Specifically, embodiments of the present invention recognize that generating training examples that are both adversarial and imperceptible can take hours and require large amounts of computing resources. Generated training examples need to be imperceptible because, in practice, attacks to the model will generate imperceptible examples to deceive humans. Adversarial training impractical since very large numbers of training examples are required and typically rely on preselected attacks such as a project gradient descent (PGD) which is difficult to maintain in the domain of ASR because of the limited number of attacks available for this kind of machine learning models. As such, embodiments of the present invention provide technical solutions for improving automatic speech recognizers by generating training examples that are both adversarial and imperceptible. For example, as discussed in greater detail later in this specification, embodiments of the present invention can generate these training examples faster and in a more efficient manner using less resources than traditional methods that does not depend on any pre-selected attack. This results in an efficient way to harden a speech recognizer over both imperceptible and adversarial attacks.

The term "adversarial" is used to specify a situation where an original audio signal is slightly modified by having a small noise signal (called a perturbation) added to the original audio signal. This results in a new signal that can fool a speech recognizer into a misclassification, i.e., the speech recognizer will produce two different text labels if it is input with the original and the new signals though they are very similar due to a slight change.

The term "imperceptible" is used to specify a situation where an original audio signal is slightly modified by having a small noise signal added, resulting in a new signal that humans cannot differentiate from the original one by their ears. The new signal is imperceptible by being modified by an imperceptible noise.

A "psychoacoustic model" models the sound perception and audiology of humans. In the described method and system, a psychoacoustic model receives an input audio signal and computes a threshold (in dB unit) for the sound pressure level as a function of frequency for each frequency in the audio signal. Humans are not able to perceive audio signals below this threshold at a specific frequency. This allows parts of an audio signal to be hidden below these threshold values to mask or cover them from human hearing. In case of an imperceptible adversarial attack over an automatic speech recognition system (referred to as an "ASR attack"), if the threshold of the perturbation generated by the attack is below the threshold of the benign signal, then the adversarial signal produced by the ASR attack is considered imperceptible.

A psychoacoustic model works on the frequency domain; therefore, it is necessary to transform the input audio signal in time domain into the frequency domain. This is usually done with Fourier Transform variants such as the short-time Fourier transform (STFT) and modified discrete cosine transform (MDCT).

Adversarial training over an automatic speech recognizer requires training examples that are both adversarial and imperceptible. These training examples are generated from original audio signals. The described method and system generate (i.e., provide) training examples by constructing an imperceptible space for each original audio signal using a psychoacoustic model and searching the imperceptible space for adversarial audio examples that have a sufficient difference to the original audio signal to be adversarial.

Given an automatic speech recognizer S, an original audio signal x is considered. The described method starts by constructing the imperceptible space of x using a psychoacoustic model. In the imperceptible space, the method searches for an adversarial sample. This is carried out by searching for imperceptible sample x' such that $S(x')S(x)$. Such an x' per definition satisfies the adversarial training requirements. The method can find as many x' as required for the adversarial training procedure.

Referring to FIG. 1, a schematic block diagram shows an example embodiment of a system 100 including an automatic speech recognizer 110 that is being trained 190 by an adversarial training system 120. The adversarial training system 120 includes an example generator 130 for generating (i.e., providing) adversarial and imperceptible examples 150 and an adversarial trainer 140 that provides performance feedback 160 to the example generator 130 relating to the training examples. The example generator 130 receives a training dataset 170 of original audio signals and uses the described method to produce adversarial and imperceptible training examples. The example generator 130 uses the speech recognizer 110 to check that the training examples are adversarial.

The adversarial trainer 140 uses the examples 150 received from the example generator 130 to train 190 the speech recognizer 110. Periodically, the adversarial trainer 140 uses a validation dataset 180 to evaluate the robustness of the speech recognizer 110 and to give feedback 160 to the example generator 130.

The example generator 130 includes an adaptive policy which receives feedback 160 from the adversarial trainer 140 to adapt and control the example generation.

Referring to FIG. 2, a swim-lane flow diagram 200 shows an example embodiment of a method as carried out at the example generator 130 and at the adversarial trainer 140.

The example generator 130 may receive 201 a training dataset X with original audio signals, with each audio signal x in X.

The method may construct 202 an imperceptible space for each of the original audio signals using a psychoacoustic model. As psychoacoustic models work in the frequency domain, constructing an imperceptible space may include generating an imperceptible noise for an original audio signal in the form of a random set of noise frequency values that perturb a frequency value of the original audio signal whilst remaining below an imperceptible threshold value for the frequency. Embodiments of the present invention can combine the imperceptible noise in the frequency domain with the original audio signal in the frequency domain and the combination transformed back to the time domain to provide an imperceptibly modified audio signal. Alternatively, embodiments of the present invention can transform the noise signal and the audio signal to the time domain separately and combined to provide an imperceptibly modified audio signal.

In the imperceptible space, the method may search 203 for candidate adversarial examples from the imperceptibly modified audio signal examples. The candidate adversarial examples are checked 204 with the speech recognizer for significant differences to the original audio signal that are required for an adversarial example.

The example generator 130 outputs 205 the resultant adversarial and imperceptible examples as an input to the adversarial trainer 140. The adversarial trainer 140 receives 211 the adversarial and imperceptible examples and trains 212 the speech recognizer using the examples. Periodically, the adversarial trainer 140 may use 213 a validation dataset to evaluate the robustness of the examples and to give performance feedback to the example generator 130. The validation set may be a collection of audio samples of human speech with labels representing the speech translated to text.

The example generator 130 may receive 206 the performance feedback from the adversarial trainer and may adapt the example generation strategy accordingly.

Referring to FIG. 3, a flow diagram 300 shows an example embodiment of generating an imperceptible and adversarial example. The method may be carried out by the example generator for each original audio signal x 310 in a training dataset X. The example generator may be in the form of an adaptive generator adapting its example generation to accommodate feedback.

The method may use the psychoacoustic model to convert 311 $x$ into the frequency domain and to compute 312 an imperceptible threshold, T, for each frequency. The psychoacoustic model returns 313 a list of frequencies F and their corresponding threshold list T.

A method based on Fourier Transform may be used to transform the audio signal from the time domain into the frequency domain. The signal in the frequency domain is a continuous or discrete distribution over all possible frequencies from 0 to infinity but may be clipped to the frequencies of interest in the range of human hearing. The psychoacoustic model then translates this distribution in the frequency domain into a continuous or discretized distribution of sound level pressure as a function of frequency.

The example generator may use a generation policy 314 to randomly choose a list T' in a corresponding order of T such that for (t', t) in (T', T): t'<t. For example, this may use a multi-gaussian or a multi-uniform distribution in the selection.

T is a list or similar of threshold values for the various frequencies in discretized frequency space to represent the continuous distribution of thresholds. T' is a list or similar of randomly selected samples values that are perturbed by adding or subtracting a noise component from the current sample's signal F and constrained to be below the corresponding value in T.

For example, if the signal is [2, 1, 12] and the thresholds are T=[4, 2, 8] then T' could, for example, be sampled as [3, 1, 0] where in this case the last value must be 0 because the signal value 12 is already larger than the threshold value of 8. There cannot be any negative values on the random noise, so they are clipped to 0.

The method may combine 315 the noise T' with the signal F and the method may apply 316 an inverse Fourier transform to (F, T') in order to obtain a new audio signal x' representing the original signal x in combination with imperceptible noise x noise. The same result may be obtained with a different sequence of steps and operations following the Fourier transform's convolution property.

The method may check 317 using the speech recognizer, if S(x') significantly differs from S(x), for example, in terms of word error rate. The significant difference level may be an optional input parameter to the generator. If true, return 318 the new audio signal x' to the adversarial trainer as an imperceptible and adversarial example. If untrue, the new audio signal is discarded 319.

The method may repeat 320 the step of randomly choosing a list of T' and the subsequent steps until the generation policy decides to stop for the current sample input signal. The repeat of the method creates a new adversarial example for the same sample by sampling again from the same threshold distribution.

The generation policy allows the generator to adapt its behavior dynamically based on performance feedback about the robustness of the speech recognizer from the adversarial trainer. For example, the generation policy may optimize when to stop repeating 320. In another example, the generation policy to decide how to randomly choose generation policy 314 T', such as to choose to use a multi-gaussian or a multi-uniform distribution.

The adversarial trainer may receive as inputs a validation dataset V, a training set X', and a speech recognizer S. The adversarial trainer may dynamically receive the training data X' from the generator and trains the speech recognizer S using X' to enhance the robustness of the speech recognizer S. Periodically, the trainer may also evaluate the robustness of the speech recognizer S using the validation dataset V by attacking the speech recognizer S over the validation dataset V, then the adversarial trainer may return performance feedback to the generator. The adversarial trainer may also decide when to stop training the speech recognizer based on the obtained performance.

Figure 4:
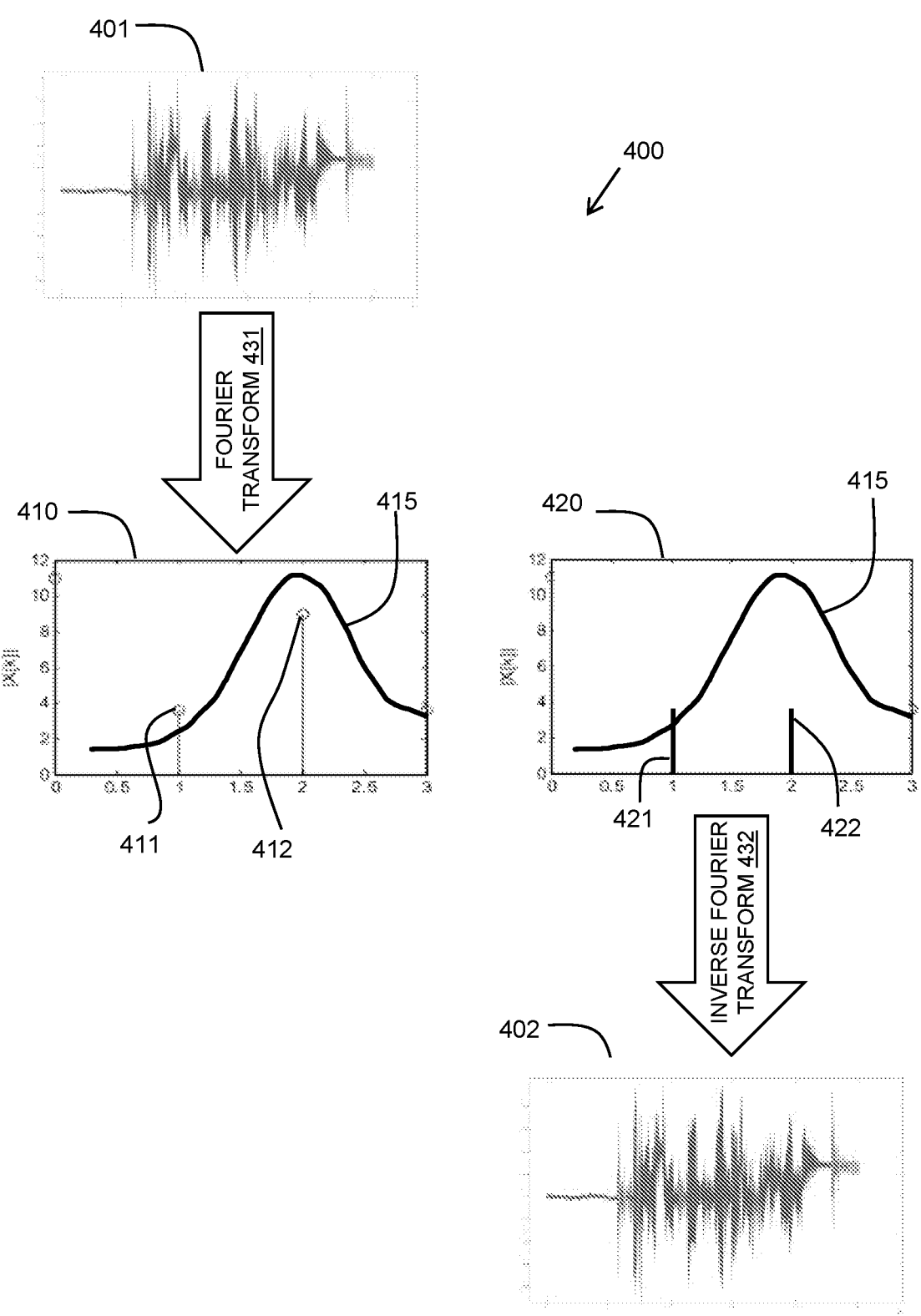
FIG. 4 is a schematic diagram of illustrating aspects of a method in accordance with embodiments of the present invention.

Referring to FIG. 4, a schematic diagram 400 illustrates the described method of generating an imperceptible and adversarial example. An audio signal 401 is input in the time domain and a Fourier transform 431 is applied to convert the audio signal to its frequency domain 410 signal 411, 412 with the y-axis describing the amplitude |X[k]| of the signal against the x-axis of frequency. Some amplitudes can be larger (e.g., signal 411) than the threshold for human perceptibility (solid line) (e.g., threshold 415) or smaller than the threshold (e.g., signal 412).

A frequency domain signal with imperceptible noise 420 is generated by randomly perturbing selected frequencies. Signals (such as signal 412) of the selected frequencies that are below the threshold(s) 415 are randomly perturbed 422 whilst keeping the amplitude of the perturbed frequency below the threshold. A random perturbance may increase or decrease the amplitude of the frequency up to the threshold line. In FIG. 4, the amplitude of the selected frequency of 422 is decreased by a random value. Selected frequencies above the thresholds (such as signal 411) remain unperturbed (e.g., signal 421) as they are perceptible.

An inverse Fourier transform 432 is applied to convert the combined signal in the frequency domain to a time domain signal 402. The time domain signal 402 is an imperceptible audio signal that is used as a candidate adversarial example.

The described method is based on a psychoacoustic model and does not depend on a pre-selected attack. This enables it to generate examples very quickly compared to prior art methods that depend on a pre-selected attack.

The adversarial training system including the example generator may be provided in cloud-based environments as a service.

The method and system provide an efficient way to harden a speech recognizer over imperceptible and adversarial attacks. The method runs fast and does not depend on any pre-selected attack.

The described method and system may be integrated into products related to artificial intelligence security. The described method and system have a wide application in areas related to artificial intelligence security, in particular those related to speech recognition, natural language processing, and adversarial robustness.

Figure 5:
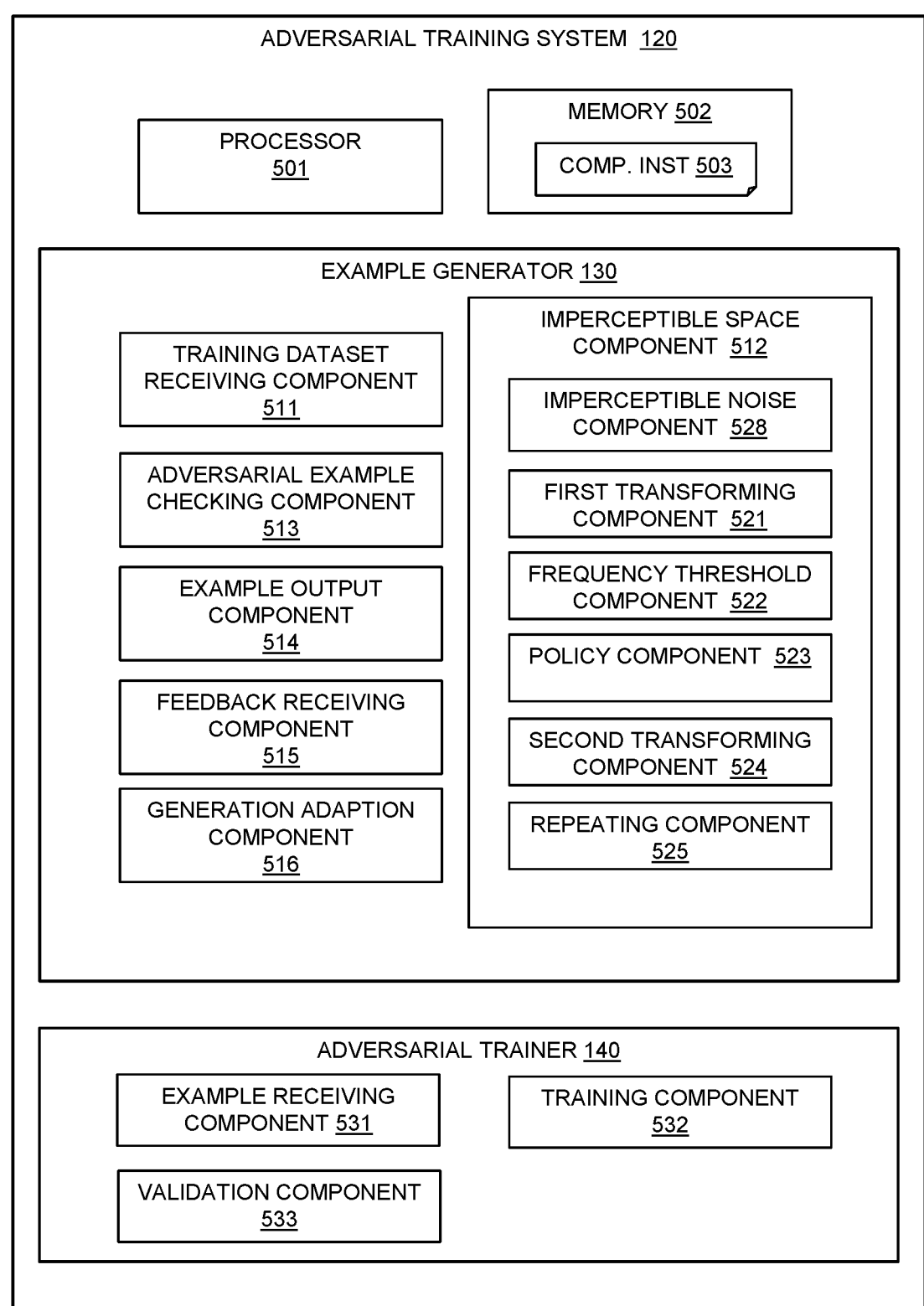
FIG. 5 is block diagram of an example embodiment of a system in accordance with embodiments of the present invention.

Referring to FIG. 5, a block diagram shows an example embodiment of the described system in the form of an adversarial training system 120 including an example generator 130 and an adversarial trainer 140. The example generator 130 may be provided remotely from the adversarial training system 120.

The adversarial training system 120 may include at least one processor 501, a hardware module, or a circuit for executing the functions of the described components which may be software units executing on the at least one processor. Multiple processors running parallel processing threads may be provided enabling parallel processing of some or all of the functions of the components. Memory 502 may be configured to provide computer instructions 503 to the at least one processor 501 to carry out the functionality of the components.

The example generator 130 may include a training dataset receiving component 511 for receiving a training dataset of original audio signals. The example generator 130 may include an imperceptible space component 512 for constructing an imperceptible space for each of the original audio signals using a psychoacoustic model.

The example generator 130 may include an adversarial example checking component 513 for searching for adversarial audio examples in the imperceptible space by checking candidate adversarial audio examples with the automatic speech recognizer to determine a sufficient difference with the original audio signals to be an adversarial audio example.

The example generator 130 may include an example output component 514 for providing the imperceptible and adversarial audio examples to an adversarial trainer for the automatic speech recognizer.

The example generator 130 may include a feedback receiving component 515 for receiving performance feedback from the adversarial trainer and a generation adaption component 516 for dynamically adapting a generation strategy.

The imperceptible space component 512 may include an imperceptible noise component 528 for generating an imperceptible noise for an original audio signal in the form of a random set of noise frequency values to perturb a frequency value of the original audio signal whilst remaining below an imperceptible threshold value for the frequency.

In one embodiment, the imperceptible space component 512 includes: a first transforming component 521 for transforming an audio signal into a frequency domain; a frequency threshold component 522 for computing an imperceptible threshold for each frequency; a policy component 523 for using a generation policy to randomly choose a set of noise frequency values with each noise frequency value perturbing a frequency value of the original audio signal whilst keeping below an imperceptible threshold value for the frequency to generate a noise signal; a second transforming component 524 for transforming the noise signal and the audio signal into a time signal to obtain an imperceptible modified audio signal. The imperceptible space component 512 may also include a repeating component 525 for repeating the generation policy for an audio signal for an adaptable number of times for an input audio signal.

The adversarial example checking component 513 may check candidate adversarial audio examples includes determining a sufficient difference in a word error rate. The adversarial example checking component 513 may determine a configurable sufficient difference level.

The adversarial trainer 140 may include: an example receiving component 531 for receiving the imperceptible and adversarial audio examples at an adversarial trainer; a training component 532 for training the automatic speech recognizer using the received examples; and a validation component 533 for periodically using a validation dataset to evaluate performance and provide performance feedback for the generation of training examples. The validation component 533 may use the validation dataset to attack the speech recognizer over the validation dataset.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1100 contains an example of an environment for the execution of at least some of the computer code involved in performing the inventive methods, such as generating training examples for training automatic speech recognizers (referenced as either block 1200 or automatic speech recognizers 1200). In addition to block 1200, computing environment 1100 includes, for example, computer 1101, wide area network (WAN) 1102, end user device (EUD) 1103, remote server 1104, public cloud 1105, and private cloud 1106. In this embodiment, computer 1101 includes processor set 1110 (including processing circuitry 1120 and cache 1121), communication fabric 1111, volatile memory 1112, persistent storage 1113 (including operating system 1122 and block 1200, as identified above), peripheral device set 1114 (including user interface (UI) device set 1123, storage 1124, and Internet of Things (IoT) sensor set 1125), and network module 1115. Remote server 1104 includes remote database 1130. Public cloud 1105 includes gateway 1140, cloud orchestration module 1141, host physical machine set 1142, virtual machine set 1143, and container set 1144.

COMPUTER 1101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1130. As is well understood in the art of computer technology, and depending upon the technology, performance of a computer-implemented method may be distributed among multiple computers and/or between multiple locations. On the other hand, in this presentation of computing environment 1100, detailed discussion is focused on a single computer, specifically computer 1101, to keep the presentation as simple as possible. Computer 1101 may be located in a cloud, even though it is not shown in a cloud in FIG. 4. On the other hand, computer 1101 is not required to be in a cloud except to any extent as may be affirmatively indicated.

PROCESSOR SET 1110 includes one, or more, computer processors of any type now known or to be developed in the future. Processing circuitry 1120 may be distributed over multiple packages, for example, multiple, coordinated integrated circuit chips. Processing circuitry 1120 may implement multiple processor threads and/or multiple processor cores. Cache 1121 is memory that is located in the processor chip package(s) and is typically used for data or code that should be available for rapid access by the threads or cores running on processor set 1110. Cache memories are typically organized into multiple levels depending upon relative proximity to the processing circuitry. Alternatively, some, or all, of the cache for the processor set may be located "off chip." In some computing environments, processor set 1110 may be designed for working with qubits and performing quantum computing.

Computer readable program instructions are typically loaded onto computer 1101 to cause a series of operational steps to be performed by processor set 1110 of computer 1101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1121 and the other storage media discussed below. The program instructions, and associated data, are accessed by processor set 1110 to control and direct performance of the inventive methods. In computing environment 1100, at least some of the instructions for performing the inventive methods may be stored in block 1200 in persistent storage 1113.

COMMUNICATION FABRIC 1111 is the signal conduction path that allows the various components of computer 1101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1112 is any type of volatile memory now known or to be developed in the future. Examples include dynamic type random access memory (RAM) or static type RAM. Typically, volatile memory 1112 is characterized by random access, but this is not required unless affirmatively indicated. In computer 1101, the volatile memory 1112 is located in a single package and is internal to computer 1101, but, alternatively or additionally, the volatile memory may be distributed over multiple packages and/or located externally with respect to computer 1101.

PERSISTENT STORAGE 1113 is any form of non-volatile storage for computers that is now known or to be developed in the future. The non-volatility of this storage means that the stored data is maintained regardless of whether power is being supplied to computer 101 and/or directly to persistent storage 1113. Persistent storage 1113 may be a read only memory (ROM), but typically at least a portion of the persistent storage allows writing of data, deletion of data and re-writing of data. Some familiar forms of persistent storage include magnetic disks and solid state storage devices. Operating system 1122 may take several forms, such as various known proprietary operating systems or open source Portable Operating System Interface-type operating systems that employ a kernel. The code included in block 1200 typically includes at least some of the computer code involved in performing the inventive methods.

PERIPHERAL DEVICE SET 1114 includes the set of peripheral devices of computer 1101. Data communication connections between the peripheral devices and the other components of computer 1101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1123 may include components such as a display screen, speaker, microphone, wearable devices (such as goggles and smart watches), keyboard, mouse, printer, touchpad, game controllers, and haptic devices. Storage 1124 is external storage, such as an external hard drive, or insertable storage, such as an SD card. Storage 1124 may be persistent and/or volatile. In some embodiments, storage 1124 may take the form of a quantum computing storage device for storing data in the form of qubits. In embodiments where computer 1101 is required to have a large amount of storage (for example, where computer 1101 locally stores and manages a large database) then this storage may be provided by peripheral storage devices designed for storing very large amounts of data, such as a storage area network (SAN) that is shared by multiple, geographically distributed computers. IoT sensor set 1125 is made up of sensors that can be used in Internet of Things applications. For example, one sensor may be a thermometer and another sensor may be a motion detector.

NETWORK MODULE 1115 is the collection of computer software, hardware, and firmware that allows computer 1101 to communicate with other computers through WAN 1102. Network module 1115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1115 are performed on the same physical hardware device. In other embodiments (for example, embodiments that utilize software-defined networking (SDN)), the control functions and the forwarding functions of network module 1115 are performed on physically separate devices, such that the control functions manage several different network hardware devices. Computer readable program instructions for performing the inventive methods can typically be downloaded to computer 1101 from an external computer or external storage device through a network adapter card or network interface included in network module 1115.

WAN 1102 is any wide area network (for example, the internet) capable of communicating computer data over non-local distances by any technology for communicating computer data, now known or to be developed in the future. In some embodiments, the WAN 1102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1103 is any computer system that is used and controlled by an end user (for example, a customer of an enterprise that operates computer 1101), and may take any of the forms discussed above in connection with computer 1101. EUD 1103 typically receives helpful and useful data from the operations of computer 1101. For example, in a hypothetical case where computer 1101 is designed to provide a recommendation to an end user, this recommendation would typically be communicated from network module 1115 of computer 1101 through WAN 1102 to EUD 1103. In this way, EUD 1103 can display, or otherwise present, the recommendation to an end user. In some embodiments, EUD 1103 may be a client device, such as thin client, heavy client, mainframe computer, desktop computer and so on.

REMOTE SERVER 1104 is any computer system that serves at least some data and/or functionality to computer 1101. Remote server 1104 may be controlled and used by the same entity that operates computer 1101. Remote server 1104 represents the machine(s) that collect and store helpful and useful data for use by other computers, such as computer 1101. For example, in a hypothetical case where computer 1101 is designed and programmed to provide a recommendation based on historical data, then this historical data may be provided to computer 1101 from remote database 1130 of remote server 1104.

PUBLIC CLOUD 1105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1105 is performed by the computer hardware and/or software of cloud orchestration module 1141. The computing resources provided by public cloud 1105 are typically implemented by virtual computing environments that run on various computers making up the computers of host physical machine set 1142, which is the universe of physical computers in and/or available to public cloud 1105. The virtual computing environments (VCEs) typically take the form of virtual machines from virtual machine set 1143 and/or containers from container set 1144. It is understood that these VCEs may be stored as images and may be transferred among and between the various physical machine hosts, either as images or after instantiation of the VCE. Cloud orchestration module 1141 manages the transfer and storage of images, deploys new instantiations of VCEs and manages active instantiations of VCE deployments. Gateway 1140 is the collection of computer software, hardware, and firmware that allows public cloud 1105 to communicate through WAN 1102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1106 is similar to public cloud 1105, except that the computing resources are only available for use by a single enterprise. While private cloud 1106 is depicted as being in communication with WAN 1102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1105 and private cloud 1106 are both part of a larger hybrid cloud.

What is claimed is:

1. A computer-implemented method comprising:

receiving a training dataset including a plurality of original audio signals;

generating adversarial training examples from an original audio signal in the training dataset for training an automatic speech recognizer by:

constructing, with a psychoacoustic model, an imperceptible space for the original audio signal;

searching for candidate audio examples in the imperceptible space; and for a set of candidate audio examples identified in the imperceptible space, determining, via the automatic speech recognizer, which candidate audio example meets a difference level to be an adversarial audio example compared to the original audio signal; and inputting the adversarial audio example to an adversarial trainer for training the automatic speech recognizer, the adversarial audio example being both adversarial and imperceptible.

2. The computer-implemented method of claim 1, wherein constructing the imperceptible space includes:

generating an imperceptible noise for the original audio signal as a random set of noise frequency values to perturb a frequency value of the original audio signal whilst remaining below an imperceptible threshold value for the frequency value.

3. The computer-implemented method of claim 1, wherein constructing the imperceptible space includes:

transforming the original audio signal into a frequency domain;

computing an imperceptible threshold for at least some frequencies;

using a generation policy to randomly choose a set of noise frequency values with each noise frequency value perturbing the original audio signal whilst keeping below an imperceptible threshold value for the frequency value to generate a noise signal; and inversely transforming the noise signal and the original audio signal to a time-domain to obtain an imperceptibly modified audio signal of the noise signal and the original audio signal.

4. The computer-implemented method of claim 1, further comprising:

receiving performance feedback from the adversarial trainer; and dynamically adapting a generation strategy for inputting audio examples into the adversarial trainer.

5. The computer-implemented method of claim 4, wherein adapting the generation strategy includes adjusting a number of repeats of adversarial training example generation for the original audio signal.

6. The computer-implemented method as claimed in claim 1, wherein checking the candidate adversarial audio examples includes:

determining a sufficient difference in a word error rate.

7. The computer-implemented method as claimed in claim 1, wherein checking the candidate adversarial audio examples includes:

determining a configurable sufficient difference level.

8. The computer-implemented method as claimed in claim 1, further comprising:

receiving multiple imperceptible and adversarial audio examples at the adversarial trainer;

training the automatic speech recognizer using the received examples; and periodically using a validation dataset to evaluate performance and provide performance feedback for the generation of additional training examples.

9. The computer-implemented method of claim 8, wherein using the validation dataset attacks the speech recognizer over the validation dataset.

10. A computer system comprising:

a processor and a memory configured to provide computer program instructions to the processor to execute a function of components of an example generator including:

a training dataset receiving a training dataset including a plurality of original audio signals;

an imperceptible space component for constructing an imperceptible space for an original audio signal using a psychoacoustic model;

an adversarial example checking component for searching for candidate audio examples in the imperceptible space by checking candidate audio examples with an automatic speech recognizer to determine which candidate audio example meets a difference level to be an adversarial audio example compared to the original audio signal;

an adversarial training example component for generating adversarial training examples from the original audio signal in the training dataset for training an automatic speech recognizer, the adversarial training examples being generated based, at least in part, on the imperceptible space constructed for the original audio signal and finding adversarial audio examples in the imperceptible space; and an example generator component for inputting the adversarial audio example to an adversarial trainer for training the automatic speech recognizer, the adversarial audio example being both adversarial and imperceptible.

11. The system of claim 10, wherein the imperceptible space component for constructing the imperceptible space includes:

an imperceptible noise component for generating an imperceptible noise for the original audio signal as a random set of noise frequency values to perturb a frequency value of the original audio signal whilst remaining below an imperceptible threshold value for the frequency value of the original audio signal.

12. The system of claim 10, wherein the imperceptible space component for constructing an imperceptible space includes:

a first transforming component for transforming the original audio signal into a frequency domain;

a frequency threshold component for computing an imperceptible threshold for each frequency;

a policy component for using a generation policy to randomly choose a set of noise frequency values with each noise frequency value perturbing a frequency value of the original audio signal whilst keeping below an imperceptible threshold value for the frequency to generate a noise signal; and a second transforming component for transforming the noise signal and the original audio signal into a time domain signal for obtaining an imperceptible modified audio signal.

13. The system of claim 10, further comprising:

a feedback receiving component for receiving performance feedback from the adversarial trainer; and a generation adaption component for dynamically adapting a generation strategy for inputting audio examples into the adversarial trainer.

14. The system as claimed in claim 13, further including:

a repeating component for repeating the generation policy for the original audio signal for an adaptable number of times.

15. The system as claimed in claim 10, wherein checking the candidate adversarial audio examples includes:

determining a sufficient difference in a word error rate.

16. The system as claimed in claim 10, wherein checking the candidate adversarial audio examples includes:

determining a configurable sufficient difference level.

17. The system as claimed in claim 10, further including an adversarial trainer including:

an example receiving component for receiving multiple imperceptible and adversarial audio examples at the adversarial trainer;

a training component for training the automatic speech recognizer using the received examples; and a validation component for periodically using a validation dataset to evaluate performance and provide performance feedback for the generation of additional training examples.

18. The system of claim 17, wherein the validation component uses the validation dataset to attack the automatic speech recognizer over the validation dataset.

19. A computer program product comprising:

one or more computer readable storage media and program instructions stored on the one or more computer readable storage media, the program instructions comprising:

program instructions to receive a training dataset including a plurality of original audio signals; and program instructions to generate adversarial training examples from an original audio signal in the training dataset for training an automatic speech recognizer, the adversarial training examples being generated based, at least in part, on an imperceptible space constructed for an original audio signal of the original audio signals and finding adversarial audio examples in the imperceptible space, wherein the program instructions to generate training examples for training an automatic speech recognize comprise:

program instructions to construct the imperceptible space for the original audio signal using a psychoacoustic model, program instructions to search for candidate audio examples in the imperceptible space; and program instructions to, for a set of candidate audio examples identified in the imperceptible space, determine, via the automatic speech recognizer, candidate audio example meets a difference level to be an adversarial audio example compared to the original audio signal; and program instructions to input the adversarial audio example to an adversarial trainer for training the automatic speech recognizer, the adversarial audio example being both adversarial and imperceptible.

* * * * *